United States Patent
Yamaya et al.

(10) Patent No.: US 10,008,715 B2
(45) Date of Patent: Jun. 26, 2018

(54) CATHODE MATERIAL FOR LITHIUM-ION SECONDARY BATTERY, METHOD FOR MANUFACTURING SAME, ELECTRODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Ryuuta Yamaya, Narashino (JP); Susumu Murata, Inzai (JP); Hirofumi Yasumiishi, Yachiyo (JP)

(73) Assignee: SUMITOMO OSAKA CEMENT CO., LTD, Tokyo (JP)

( * ) Notice: Subject to any disclaimer, the term of this patent is extended or adjusted under 35 U.S.C. 154(b) by 0 days. days.

(21) Appl. No.: 15/460,749

(22) Filed: Mar. 16, 2017

(65) Prior Publication Data

US 2018/0097224 A1  Apr. 5, 2018

(30) Foreign Application Priority Data

Sep. 30, 2016  (JP) ................. 2016-193370

(51) Int. Cl.
| | |
|---|---|
| *H01M 4/36* | (2006.01) |
| *H01M 10/0525* | (2010.01) |
| *H01M 4/58* | (2010.01) |
| *H01M 4/62* | (2006.01) |
| *H01M 4/66* | (2006.01) |
| *H01M 4/02* | (2006.01) |

(52) U.S. Cl.
CPC .......... *H01M 4/364* (2013.01); *H01M 4/366* (2013.01); *H01M 4/5825* (2013.01); *H01M 4/625* (2013.01); *H01M 4/661* (2013.01); *H01M 10/0525* (2013.01); *H01M 2004/028* (2013.01)

(58) Field of Classification Search
CPC .... H01M 4/364; H01M 4/5825; H01M 4/625; H01M 4/366; H01M 4/661; H01M 10/0525; H01M 2004/028
See application file for complete search history.

(56) References Cited

U.S. PATENT DOCUMENTS

2012/0231341 A1* 9/2012 Kim ................. C01G 51/42
　　　　　　　　　　　　　　　　　　　　　429/223
2016/0372749 A1  12/2016 Iida et al.

FOREIGN PATENT DOCUMENTS

| JP | 2009-048958 A | 3/2009 |
|---|---|---|
| JP | 2012-104290 A | 5/2012 |
| JP | 5343347 B2 | 8/2013 |
| JP | 2013-182689 A | 9/2013 |
| JP | 2015-018678 A | 1/2015 |

* cited by examiner

*Primary Examiner* — Jane Rhee
(74) *Attorney, Agent, or Firm* — Greenblum & Bernstein, P.L.C.

(57) ABSTRACT

A cathode material for a lithium-ion secondary battery made of agglomerated particles formed by agglomeration of a plurality of primary particles of a cathode active material represented by General Formula (1) below which are coated with a carbonaceous film, in which, in a case in which a cathode mixture layer including the cathode material, a conductive auxiliary agent, and a binding agent in a weight ratio (the cathode material/the conductive auxiliary agent/ the binding agent) of 90:5:5 is calendered on a 30 μm-thick aluminum current collector at a total applied pressure of 5 t/250 mm, a film thickness change percentage of the cathode mixture layer before and after the calendering is 30% or less, $$Li_xA_yD_zPO_4 \qquad (1).$$

7 Claims, No Drawings

CATHODE MATERIAL FOR LITHIUM-ION SECONDARY BATTERY, METHOD FOR MANUFACTURING SAME, ELECTRODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2016-193370 filed Sep. 30, 2016, the disclosure of which is herein incorporated by reference in its entirety.

BACKGROUND OF THE INVENTION

Field of the Invention

The present invention relates to a cathode material for a lithium-ion secondary battery, a method for manufacturing the cathode material, an electrode for a lithium-ion secondary battery using the cathode material, and a lithium-ion secondary battery including the electrode.

Description of Related Art

Lithium-ion secondary batteries have a higher energy density and a higher power density than lead batteries and nickel-hydrogen batteries and are used in a variety of applications such as small-size electronic devices such as smartphones, domestic backup power supply, and electric tools. In addition, attempts are made to put high-capacity lithium-ion secondary batteries into practical use for recyclable energy storage such as photovoltaic power generation and wind power generation.

Lithium-ion secondary batteries include a cathode, an anode, and a separator. As electrode materials that constitute cathodes, lithium-containing metal oxides having properties capable of reversibly intercalating and deintercalating lithium ions such as lithium cobalt oxide ($LiCoO_2$), lithium manganese oxide ($LiMn_2O_4$), and lithium iron phosphate ($LiFePO_4$) are used, and studies are made in order for improvement from the viewpoint of an increase in the capacity of batteries, the extension of service lives, improvement of safety, and cost reduction.

Lithium iron phosphate ($LiFePO_4$) as the electrode material contains iron which is an abundant and inexpensive resource and is thus a material the cost of which can be easily reduced. Lithium iron phosphate does not emit oxygen at high temperatures due to the strong covalent bond between phosphorus and oxygen and thus has outstanding safety, which provides lithium iron phosphate with excellent characteristics that oxide-based cathode materials represented by lithium cobalt oxide do not have.

On the other hand, lithium iron phosphate has low Li ion diffusivity and low electron conductivity and thus has worse input and output characteristics than oxide-based cathode materials. This characteristic difference becomes more significant as the operation temperature of batteries becomes lower, and thus lithium iron phosphate has been considered to be inappropriate for in-vehicle applications such as hybrid vehicles for which high input and output characteristics are required at low-temperature regions.

$LiMPO_4$ (M represents a metal element) having an olivine structure which is represented by lithium iron phosphate has low Li ion diffusivity and low electron conductivity, and thus it is possible to improve the charge and discharge characteristics by miniaturizing $LiMPO_4$ primary particles and coating the surfaces of the respective primary particles with a conductive carbonaceous film.

On the other hand, since the miniaturized $LiMPO_4$ has a large specific surface area, an increase in the viscosity of an electrode mixture slurry or a large amount of a binder is required, and thus it is unusual to improve the properties of the electrode mixture slurry by turning the primary particles coated with a carbonaceous film into secondary particles by means of granulation.

For example, as an electrode material, Japanese Patent No. 5343347 discloses a cathode active material for a lithium secondary battery in which primary particle crystals agglomerate together and thus form spherical secondary particles and which includes parent particles which have pores on the surfaces and the inside of the secondary particles and are made of a lithium nickel manganese-based complex oxide and conductive fine powder loaded into part of the pores of the parent particles. In addition, Japanese Laid-open Patent Publication No. 2015-018678 discloses a cathode active material for a lithium secondary battery including particles having pores in secondary particles.

SUMMARY OF THE INVENTION

Electrode mixture layers are formed by applying, drying, and calendering an electrode slurry obtained by mixing an electrode material, a conductive auxiliary agent, a binder, or the like on an aluminum current collector. However, in the electrode materials described in Japanese Patent No. 5343347 and Japanese Laid-open Patent Publication No. 2015-018678, since pores are present in the secondary particles (hollow secondary particles), during calendering, the secondary particles excessively deform or break or conductive carbonaceous films are peeled off, which causes the degradation of battery characteristics. In addition, due to pores present among the secondary particles, the electrode structure becomes uneven, and Li ion conductivity and electron conductivity decrease.

The present invention has been made in consideration of the above-described circumstances, and an object of the present invention is to provide a cathode material for a lithium-ion secondary battery capable of improving Li ion conductivity and electron conductivity, a method for manufacturing the cathode material, an electrode for a lithium-ion secondary battery using the cathode material, and a lithium-ion secondary battery having improved charge and discharge characteristics.

The present inventors and the like carried out intensive studies in order to achieve the above-described object and found that the object can be achieved by means of the following inventions.

<1> A cathode material for a lithium-ion secondary battery made of agglomerated particles formed by agglomeration of a plurality of primary particles of a cathode active material represented by General Formula (1) below which are coated with a carbonaceous film, in which, in a case in which a cathode mixture layer including the cathode material, a conductive auxiliary agent, and a binding agent in a weight ratio (the cathode material/the conductive auxiliary agent/the binding agent) of 90:5:5 is calendered on a 30 μm-thick aluminum current collector at a total applied pressure of 5 t/250 mm, a film thickness change percentage of the cathode mixture layer before and after the calendering is 30% or less, $$Li_xA_yD_zPO_4 \qquad (1)$$

(here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

<2> The cathode material for a lithium-ion secondary battery according to <1>, in which a particle diameter (D90) at a cumulative percentage of 90% in a cumulative particle size distribution of the cathode material is 15 μm or less, and an oil absorption amount for which N-methyl-2-pyrrolidone is used is 50 ml/100 g or less.

<3> The cathode material for a lithium-ion secondary battery according to <1> or <2>, in which a specific surface area of the cathode material is 10 m²/g or more and 25 m²/g or less, and a powder resistance value is 500 Ω·cm or less.

<4> A method for manufacturing the cathode material for a lithium-ion secondary battery according to any one of <1> to <3> includes a manufacturing step of a cathode active material represented by General Formula (1) and a cathode active material precursor; a slurry preparation step of preparing a slurry by mixing at least one cathode active material raw material selected from the group consisting of the cathode active material and the cathode active material precursor obtained in the above-described step and water; a granulation step of obtaining a granulated body by adding an agglomeration-maintaining agent to the slurry obtained in the above-described step; and a calcination step of mixing an organic compound which is a carbonaceous film precursor into the granulated body obtained in the above-described step in a dry manner and calcinating the obtained mixture in a non-oxidative atmosphere.

<5> An electrode for a lithium-ion secondary battery, including: an aluminum current collector; and a cathode mixture layer formed on the aluminum current collector, in which the cathode mixture layer includes the cathode material for a lithium-ion secondary battery according to any one of <1> to <3>.

<6> The electrode for a lithium-ion secondary battery according to <5>, in which an electrode density of the cathode mixture layer after drying is 1.0 g/cm³ or more.

<7> A lithium-ion secondary battery, including: a cathode; an anode; and an electrolyte, in which the cathode includes an electrode for a lithium-ion secondary battery according to <5> or <6>.

According to the present invention, it is possible to provide a cathode material for a lithium-ion secondary battery capable of improving Li ion conductivity and electron conductivity, a method for manufacturing the cathode material, an electrode for a lithium-ion secondary battery using the cathode material, and a lithium-ion secondary battery having improved charge and discharge characteristics.

DETAILED DESCRIPTION OF THE INVENTION

An embodiment of a cathode material for a lithium-ion secondary battery of the present invention will be described.

Meanwhile, the present embodiment is a specific description for easier understanding of the gist of the present invention and, unless particularly otherwise described, does not limit the present invention.

Cathode Material for Lithium-Ion Secondary Battery

A cathode material for a lithium-ion secondary battery of the present embodiment is made of agglomerated particles formed by agglomeration of a plurality of primary particles of a cathode active material represented by General Formula (1) below which are coated with a carbonaceous film. In addition, in a case in which a cathode mixture layer including the cathode material, a conductive auxiliary agent, and a binding agent in a weight ratio (the cathode material/the conductive auxiliary agent/the binding agent) of 90:5:5 is calendered on a 30 μm-thick aluminum current collector at a total applied pressure of 5 t/250 mm, a film thickness change percentage of the cathode mixture layer before and after the calendering is 30% or less.

$$Li_xA_yD_zPO_4 \quad (1)$$

(here, A represents at least one element selected from the group consisting of Co, Mn, Ni, Fe, Cu, and Cr, D represents at least one element selected from the group consisting of Mg, Ca, Sr, Ba, Ti, Zn, B, Al, Ga, In, Si, Ge, Sc, and Y, $0.9<x<1.1$, $0<y\leq1$, $0\leq z<1$, and $0.9<y+z<1.1$).

The electrode active material that is used in the present invention is represented by General Formula (1).

Here, A is preferably Co, Mn, Ni, or Fe, and more preferably Fe. D is preferably Mg, Ca, Sr, Ba, Ti, Zn, or Al. In a case in which the electrode active material includes these elements, it is possible to produce cathode mixture layers capable of realizing a high discharge potential and favorable safety. In addition, these elements are resources having an abundant amount and are thus preferred as materials to be selected.

The average primary particle diameter of the primary particles of the cathode active material represented by General Formula (1) which are coated with a carbonaceous film (carbonaceous coated electrode active material) is preferably 10 nm or more and 400 nm or less, more preferably 20 nm or more and 300 nm or less, and still more preferably 20 nm or more and 200 nm or less.

When the average primary particle diameter of the primary particles is 10 nm or more, an increase in the amount of necessary carbon due to an increase in the specific surface area of the primary particles of the cathode active material is suppressed, and it is possible to suppress a decrease in the charge and discharge capacity per unit mass of the cathode material. In addition, it becomes easy to uniformly coat the surfaces of the primary particles of the cathode active material with a carbonaceous film. As a result, lithium-ion secondary batteries for which the cathode material for a lithium-ion secondary battery of the present embodiment is used have a discharge capacity that increases during high-speed charge and discharge and are capable of realizing sufficient charge and discharge performance. On the other hand, when the average primary particle diameter of the primary particles is 400 nm or less, it is possible to suppress an increase in the lithium ion diffusion resistance or the electron migration resistance in the primary particles of the cathode active material. As a result, lithium-ion secondary batteries for which the cathode material for a lithium-ion secondary battery of the present embodiment are capable of increasing the discharge capacity during high-speed charge and discharge.

Here, the average primary particle diameter is a number-average particle diameter. The average primary particle diameter of the primary particles can be obtained by randomly selecting 100 primary particles, measuring the long diameters and short diameters of the respective primary particles using a scanning electron microscope (SEM), and obtaining an average value thereof.

The carbonaceous film is a film intended to impart desired electron conductivity to the primary particles.

The thickness of the carbonaceous film is preferably 0.5 nm or more and 5.0 nm or less and more preferably 1.0 nm or more and 3.0 nm or less.

When the thickness of the carbonaceous film is 0.5 nm or more, the thickness of the carbonaceous film becomes too thin, and it is possible to form a film having a desired resistance value. As a result, the conductivity improves, and it is possible to ensure conductivity suitable for cathode materials. On the other hand, when the thickness of the carbonaceous film is 5.0 nm or less, battery activity, for example, the battery capacity of the cathode material per unit mass, decreases.

In addition, the coating ratio of the carbonaceous film to the primary particles is preferably 60% or more and particularly preferably 80% or more. When the coating ratio of the carbonaceous film is 60% or more, the coating effect of the carbonaceous film can be sufficiently obtained.

The amount of carbon included in the primary particles is preferably 0.5% by mass or more and 5.0% by mass or less and more preferably 0.8% by mass or more and 2.5% by mass or less.

When the amount of carbon is 0.5% by mass or more, it is possible to ensure conductivity suitable for cathode materials, the discharge capacity at a high charge-discharge rate increases in a case in which lithium-ion secondary batteries are formed, and it is possible to realize sufficient charge and discharge rate performance. On the other hand, when the amount of carbon is 5.0% by mass or less, the amount of carbon becomes too large, and it is possible to suppress the battery capacity of lithium-ion secondary batteries per unit mass of the cathode material for a lithium-ion secondary battery decreasing more than necessary.

The average secondary particle diameter of the agglomerated particles formed by the agglomeration of a plurality of the primary particles is preferably 0.5 μm or more and 15 μm or less and more preferably 1.0 μm or more and 10 μm less. When the average secondary particle diameter of the agglomerated particles is 0.5 μm or more, it is possible to suppress the blending amount of a conductive auxiliary agent and a binding agent when cathode material paste for a lithium-ion secondary battery is prepared by mixing the cathode material, the conductive auxiliary agent, and a binder resin (the binding agent) together, and it is possible to increase the battery capacity of lithium-ion secondary batteries per unit mass of the cathode mixture layer for a lithium-ion secondary battery. On the other hand, when the average secondary particle diameter of the agglomerated particles is 15 μm or less, it is possible to enhance the dispersibility and uniformity of the conductive auxiliary agent or the binding agent in the cathode mixture layer. As a result, lithium-ion secondary batteries for which the cathode material for a lithium-ion secondary battery of the present embodiment is used are capable of increasing the discharge capacity during high-speed charge and discharge.

Here, the average secondary particle diameter is a volume-average particle diameter. The average secondary particle diameter of the agglomerated particles can be measured using a laser diffraction and scattering particle size distribution analyzer or the like. In addition, the average secondary particle diameter may be obtained by randomly selecting 100 agglomerated particles, measuring the long diameters and short diameters of the respective agglomerated particles using a scanning electron microscope (SEM), and obtaining an average value thereof.

The agglomerated particles are preferably solid particles since it is possible to make the electrode structure uniform. Here, the solid particle refers to a particle substantially having no space therein and may include unintentionally-formed spaces such as fine pores among the primary particles. When the electrode structure is uniform, not only do the Li ion conductivity and the electron conductivity improve, but the calendering pressure during the production of cathodes is also suppressed, and it is possible to suppress the peeling of the carbonaceous film due to the collapse of the agglomerated particles. In addition, it is possible to prevent the dropping of the electrode mixture layer from the aluminum current collector. In such a case, it is possible to suppress the degradation of battery characteristics.

The particle diameters (D90) at which the cumulative percentage of the cathode material made of the agglomerated particles is 90% in the cumulative particle size distribution is preferably 15 μm or less, more preferably 13 μm or less, and still more preferably 12 μm or less. When D90 is 15 μm or less, the diameters of the agglomerated particles become too large relative to the thickness of the cathode mixture layer, the surface of the cathode mixture layer does not easily become uneven, and the structure of the cathode mixture layer becomes uniform. In addition, the lower limit value of D90 is not particularly limited, but is preferably 3.0 μm or more. In addition, the shape of the agglomerated particle for improving the loading properties of the cathode material into the cathode mixture layer and improving the battery capacity per unit volume is not particularly limited, but is preferably spherical, particularly, truly spherical.

The specific surface area of the cathode material is preferably 10 $m^2/g$ or more and 25 $m^2/g$ or less, more preferably 10 $m^2/g$ or more and 20 $m^2/g$ or less, and still more preferably 10 $m^2/g$ or more and 15 $m^2/g$ or less. When the specific surface area is 10 $m^2/g$ or more, the Li ion diffusion resistance or the electron migration resistance in the primary particles of the cathode material for a lithium-ion secondary battery decreases. Therefore, it is possible to decrease the internal resistance, and the output characteristics can be improved. On the other hand, when the specific surface area is 25 $m^2/g$ or less, the specific surface area of the cathode material for a lithium-ion secondary battery does not excessively increase, the mass of necessary carbon is suppressed, and it is possible to improve the battery capacity of lithium-ion secondary batteries per unit mass of the cathode material for a lithium-ion secondary battery.

Meanwhile, the specific surface areas can be measured using a specific surface area meter (for example, manufactured by MicrotracBEL Corp., trade name: BELSORP-mini,) and the BET method.

The oil absorption amount of the cathode material, for which N-methyl-2-pyrrolidone (NMP) is used, is preferably 50 ml/100 g or less, more preferably 45 ml/100 g or less, and still more preferably 40 ml/100 g or less. When the NMP oil absorption amount is 50 ml/100 g or less, during the preparation of the cathode material paste for a lithium-ion secondary battery by mixing the cathode material, the conductive auxiliary agent, and the binder resin (the binding agent) together, the binding agent or a solvent does not easily intrude into the agglomerated particles, an increase in the paste viscosity is suppressed, and it is possible to improve the properties of being applied onto the aluminum current collector. In addition, a necessary amount of the binding agent is obtained, and it is possible to improve the binding properties between the cathode mixture layer and the aluminum current collector.

Meanwhile, the NMP oil absorption amount can be measured using a method described in the examples.

The powder resistance value of the cathode material is preferably 500 Ω·cm or less, more preferably 400 Ω·cm or less, and still more preferably 300 Ω·cm or less. When the powder resistance value is 500 Ω·cm or less, it is possible to improve electron conductivity.

Meanwhile, the powder resistance value can be measured using a specimen formed by molding the cathode material at a pressure of 50 MPa, and, specifically, can be measured using a method described in the examples.

In the cathode material for a lithium-ion secondary battery of the present embodiment, in a case in which the cathode mixture layer including the electrode material, a conductive auxiliary agent, and a binding agent in a weight ratio (the electrode material/the conductive auxiliary agent/the binding agent) of 90:5:5 is calendered on a 30 μm-thick aluminum current collector at a total applied pressure of 5 t/250 mm, the film thickness change percentage of the cathode mixture layer before and after the calendering can be set to 30% or less, preferably set to 25% or less, and more preferably set to 20% or less.

When the film thickness change percentage of the cathode mixture layer before and after the calendering is more than 30%, there is a concern that the agglomerated particles in the cathode mixture layer may deform or break or the carbonaceous film may be peeled off from the agglomerated particle surfaces and battery characteristics may degrade.

Meanwhile, the film thickness change percentage can be measured using a method described in the examples.

Method for Manufacturing Cathode Material for Lithium-Ion Secondary Battery

A method for manufacturing the cathode material for a lithium-ion secondary battery of the present embodiment includes a manufacturing step of a cathode active material represented by General Formula (1) and a cathode active material precursor, a slurry preparation step of preparing a slurry by mixing at least one cathode active material raw material selected from the group consisting of the cathode active material and the cathode active material precursor obtained in the above-described step and water, a granulation step of obtaining a granulated body by adding an agglomeration-maintaining agent to the slurry obtained in the above-described step, and a calcination step of mixing an organic compound which is a carbonaceous film precursor into the granulated body obtained in the above-described step in a dry manner and calcinating the obtained mixture in a non-oxidative atmosphere.

Manufacturing Method of Cathode Active Material and Cathode Active Material Precursor As the manufacturing step of the cathode active material represented by General Formula (1) and the cathode active material precursor, it is possible to use a method of the related art such as a solid phase method, a liquid phase method, or a gas phase method. Examples of $Li_xA_yD_zPO_4$ obtained using the above-described method include particulate $Li_xA_yD_zPO_4$ (hereinafter, in some cases, referred to as "$Li_xA_yM_zPO_4$ particles").

The $Li_xA_yD_zPO_4$ particles can be obtained by, for example, hydrothermally synthesizing a slurry-form mixture obtained by mixing a Li source, an A source, a P source, water, and, as necessary, a D source. By means of the hydrothermal synthesis, $Li_xA_yD_zPO_4$ is generated as a precipitate in water. The obtained precipitate may be a precursor of $Li_xA_yD_zPO_4$. In this case, target $Li_xA_yD_zPO_4$ particles are obtained by calcinating the precursor of $Li_xA_yD_zPO_4$.

In this hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like. Among these, as the Li source, at least one selected from the group consisting of lithium acetate, lithium chloride, and lithium hydroxide is preferably used.

Examples of the A source include chlorides, carboxylates, sulfates, and the like which include at least one element selected from the group consisting of Co, Mn, Ni, Fe, Cu, and Cr. For example, in a case in which A in $Li_xA_yD_zPO_4$ is Fe, examples of the Fe source include divalent iron salts such as iron (II) chloride ($FeCl_2$), iron (II) acetate (Fe($CH_3COO$)$_2$), and iron (II) sulfate ($FeSO_4$). Among these, as the Fe source, at least one selected from the group consisting of iron (II) chloride, iron (II) acetate, and iron (II) sulfate is preferably used.

Examples of the D source include chlorides, carboxylates, sulfates, and the like which include at least one element selected from the group consisting of Mg, Ca, Co, Sr, Ba, Ti, Zn, B, Al, Ga, In, Si, Ge, Sc, and Y.

Examples of the P source include phosphoric acid compounds such as phosphoric acid ($H_3PO_4$), ammonium dihydrogen phosphate ($NH_4H_2PO_4$), diammonium phosphate (($NH_4$)$_2HPO_4$), and the like. Among these, as the P source, at least one selected from the group consisting of orthophosphoric acid, ammonium dihydrogen phosphate, and diammonium phosphate is preferably used.

Slurry Preparation Step

In the present step, a cathode active material raw material obtained in the above-described step is dispersed in water, thereby preparing a homogeneous slurry. When the cathode active material raw material is dispersed in water, it is also possible to add a dispersant thereto. A method for dispersing the cathode active material raw material in water is not particularly limited, and it is preferable to use, for example, a medium stirring-type dispersion device that stirs medium particles at a high rate such as a planetary ball mill, an oscillation ball mill, a bead mill, a paint shaker, or an attritor.

During the preparation of the slurry, the ratio (D90/D10) of the particle diameter (D90) at a cumulative percentage of 90% to the particle diameter (D10) at 10% in the cumulative particle size distribution of the cathode active material raw material in the slurry may be controlled to reach 1 or more and 30 or less. When (D90/D10) is set in the above-described range, the particle size distribution of the cathode active material raw material in the slurry becomes broad, the density of agglomerated particles to be obtained increases, and the effects of the present invention can be exhibited. In addition, when (D90/D10) is set in the above-described range, the viscosity of the slurry decreases, and it is possible to suppress the generation of air bubbles and the like in the slurry in the granulation step described below.

Meanwhile, the dispersion conditions of the slurry can be adjusted using, for example, the concentration, stirring rate, stirring time, and the like of the cathode active material raw material in the slurry.

Granulation Step

In the present step, a granulated body is manufactured from the cathode active material raw material in the slurry. The granulated body is preferably solid particles from the viewpoint of exhibiting the effects of the present invention. In addition, it is preferable to mix a minimum necessary amount of an agglomeration-maintaining agent into the slurry so as to prevent the collapse of the granulated body.

Here, the agglomeration-maintaining agent refers to a compound which helps the agglomeration of the primary particles and maintains the shape of the secondary particles formed by the agglomeration of the primary particles.

During the granulation, when the generation of air bubbles and the like in the slurry is suppressed, it becomes easy to obtain solid particles. As a method for suppressing the generation of air bubbles and the like and suppressing the collapse of the granulated body, in the present invention, the agglomeration-maintaining agent is added to the slurry in the granulation step. Specific examples thereof include a method in which an organic acid such as citric acid, polyacrylic acid, or ascorbic acid is added to and mixed with the slurry as the agglomeration-maintaining agent. When the pH of the slurry is decreased using the organic acid, the agglomeration of the primary particles is helped, secondary particles in which the primary particles are more densely packed can be formed after the granulation, and it is possible to increase the strength of the secondary particles.

The reason for selecting the organic acid is that, in the calcination step described below, it is preferable that the agglomeration-maintaining agent does not remain as an impurity in the calcination step described below and is carbonized as part of the carbonaceous film. However, the organic acid does not easily remain as coal, and thus the selection of the organic acid does not always generate the carbonaceous film and, furthermore, it is difficult to form favorable carbonaceous films, and thus the addition of a large amount of the organic acid is not preferable. In addition, a carbonization catalyst may be used in order to accelerate the carbonization of the organic compound in the calcination step described below.

The blending amount of the agglomeration-maintaining agent is preferably 0.1% to 1.0% by mass and more preferably 0.2% to 0.5% by mass of the cathode active material raw material in terms of the solid contents. When the blending amount is set to 0.1% by mass or more, the collapse of the granulated body can be suppressed, and, when the blending amount is 1.0% by mass or less, it is possible to suppress the generation of air bubbles and the like derived from the agglomeration-maintaining agent.

In addition, when the concentration of the cathode active material raw material in the slurry is prepared to be preferably 15% to 55% by mass and more preferably 20% to 50% by mass, it is possible to obtain spherical solid particles.

Next, the mixture obtained above is sprayed and dried in a high-temperature atmosphere in which the atmosphere temperature is the boiling point or higher of the solvent, for example, in the atmosphere at 100° C. to 250° C.

Here, when the conditions during the spraying, for example, the concentration, spraying pressure, and rate of the cathode active material raw material in the slurry, and furthermore, the conditions during the drying after the spraying, for example, the temperature-increase rate, the peak holding temperature, the holding time, and the like are appropriately adjusted, a dried substance having an average secondary particle diameter of the agglomerated particles, which has been described above, in the above-described range can be obtained.

The atmosphere temperature during the spraying and drying have an influence on the evaporation rate of the solvent in the slurry, and the structure of a dried substance to be obtained by means of spraying and drying can be controlled using the atmosphere temperature.

For example, as the atmosphere temperature approximates to the boiling point of the solvent in the slurry, the time taken to dry sprayed liquid droplets extends, and thus the dried substance to be obtained is sufficiently shrunk during the time required for the drying. Therefore, the dried substance sprayed and dried at the atmosphere temperature near the boiling point of the solvent in the slurry is likely to have a solid structure.

Calcination Step

In the present step, the granulated body obtained in the above-described step is calcinated in a non-oxidative atmosphere.

First, before calcination, an organic compound which is a carbonaceous film precursor is mixed into the granulated body in a dry manner.

The organic compound is not particularly limited as long as the organic compound is capable of forming the carbonaceous film on the surface of the cathode active material, and examples thereof include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols, trivalent alcohols, and the like. However, examples thereof do not include those considered as the organic acid that is used in the above-described granulation step. These organic compounds may be used singly or a mixture of two or more organic compounds may be used.

Regarding the blending ratio between the organic compound and the cathode active material raw material, the weight of carbon obtained from the organic compound is preferably 0.5 parts by mass or more and 2.5 parts by mass or less with respect to 100 parts by mass of an active material that is obtained from the cathode active material raw material. The actual blending amount varies depending on the carbonization amount (the kind of the carbon source or the carbonization conditions) by means of heating and carbonization, but is approximately 0.7 parts by weight to 6 parts by weight.

Next, the mixture obtained by means of the above-described drying and mixing is calcinated in a non-oxidative atmosphere at a temperature of preferably 650° C. or higher and 1,000° C. or lower and more preferably 700° C. or higher and 900° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the mixture, a reducing atmosphere including approximately several percentages by volume of a reducing gas such as hydrogen ($H_2$) is preferred. In addition, for the purpose of removing organic components evaporated in the non-oxidative atmosphere during calcination, a susceptible or burnable gas such as oxygen ($O_2$) may be introduced into the non-oxidative atmosphere.

Here, when the calcination temperature is set to 650° C. or higher, it is easy for the organic compound in the mixture to be sufficiently decomposed and reacted, and the organic compound is easily and sufficiently carbonized. As a result, it is easy to prevent the generation of a high-resistance decomposed substance of the organic compound in the obtained agglomerated particles. Meanwhile, when the calcination temperature is set to 1,000° C. or lower, lithium (Li) in the cathode active material raw material is not easily evaporated, and the grain growth of the cathode active material to a size that is equal to or larger than the target size is suppressed. As a result, in a case in which a lithium-ion secondary battery including a cathode including the cathode material of the present embodiment is produced, it is possible to prevent the discharge capacity at a high charge-discharge rate from decreasing, and it is possible to realize lithium-ion secondary batteries having sufficient charge and discharge rate performance.

By means of the above-described steps, the organic compound in the mixture is carbonized, the primary particles that cover the surface of the cathode active material with the carbonaceous film derived from the organic compound are generated, and a plurality of the primary particles agglomerate together so as to become agglomerated particles.

Electrode for Lithium-Ion Secondary Battery

An electrode for a lithium-ion secondary battery of the present embodiment includes an aluminum current collector and a cathode mixture layer formed on the aluminum current collector, and the cathode mixture layer includes the cathode material for a lithium-ion secondary battery or a cathode material obtained using the method for manufacturing the cathode material for a lithium-ion secondary battery. Since the cathode mixture layer includes the cathode material, the electrode for a lithium-ion secondary battery of the present embodiment has excellent Li ion conductivity and electron conductivity.

The electrode density of the cathode mixture layer after drying is preferably 1.0 g/cm$^3$ or more and more preferably 1.1 g/cm$^3$ or more. When the electrode density of the cathode mixture layer after drying is 1.0 g/cm$^3$ or more, it is possible to improve electron conductivity.

Meanwhile, the electrode density can be measured using a method described in the examples.

Method for Manufacturing Electrode

In order to produce the electrode, the cathode material, a binding agent made of a binder resin, and a solvent are mixed together, thereby preparing paint for forming the electrode or paste for forming the electrode. At this time, as necessary, a conductive auxiliary agent such as carbon black, acetylene black, graphite, Ketjen black, natural graphite, or artificial graphite may be added thereto.

As the binding agent, that is, the binder resin, for example, a polytetrafluoroethylene (PTFE) resin, a polyvinylidene fluoride (PVdF) resin, fluorine rubber, or the like is preferably used.

The blending ratio between the cathode material and the binder resin is not particularly limited, and, for example, the content of the binder resin is set to 1 part by mass to 30 parts by mass and preferably set to 3 parts by mass to 20 parts by mass with respect to 100 parts by mass of the cathode material.

The solvent that is used in the paint for forming the electrode or the paste for forming the electrode may be appropriately selected depending on the properties of the binder resin.

Examples thereof include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidone (NMP), glycols such as ethylene glycol, diethylene glycol, and propylene glycol, and the like. These solvents may be used singly, or a mixture of two or more solvents may be used.

Next, the paint for forming the electrode or the paste for forming the electrode is applied onto one surface of an aluminum foil and is then dried, thereby obtaining the aluminum foil having a coated film made of a mixture of the cathode material and the binder resin formed on one surface.

Next, the coated film is pressed under pressure and is dried, thereby producing a current collector (electrode) having an electrode material layer on one surface of the aluminum foil.

In the above-described manner, electrodes having excellent Li ion conductivity and electron conductivity can be produced.

Lithium-Ion Secondary Battery

A lithium-ion secondary battery of the present embodiment includes a cathode, an anode, and an electrolyte and includes the electrode for a lithium-ion secondary battery as the cathode. Therefore, Li ion conductivity and electron conductivity are excellent, and the charge and discharge characteristics of lithium-ion secondary batteries can be improved.

Examples of the anode include anodes including a carbon material such as metallic Li, natural graphite, or hard carbon or an anode material such as a Li alloy, $Li_4Ti_5O_{12}$, or Si ($Li_{4.4}Si$).

The electrolyte is not particularly limited, but is preferably a non-aqueous electrolyte, and examples thereof include electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm$^3$.

The cathode and the anode can be made to face each other through a separator. As the separator, it is possible to use, for example, porous propylene.

In addition, instead of the non-aqueous electrolyte and the separator, a solid electrolyte may be used.

EXAMPLES

Hereinafter, the present invention will be specifically described using examples and comparative examples. Meanwhile, the present invention is not limited to forms described in the examples.

Synthesis of Cathode Material for Lithium-Ion Secondary Battery

Example 1

Lithium phosphate ($Li_3PO_4$) as a Li source and a P source and iron (II) sulfate ($FeSO_4$) as a Fe source were mixed together so that the molar ratio (Li:Fe:P) reached 3:1:1. Furthermore, distilled water for preparation was mixed thereinto, thereby preparing a raw material slurry (600 ml).

Next, this raw material slurry was stored in a pressure-resistant airtight container, was hydrothermally synthesized at 180° C. for two hours, and was cooled to room temperature (25° C.), thereby obtaining cake-form cathode active material particles which were precipitated in the container. The cathode active material particles were sufficiently cleaned a plurality of times with distilled water, and then the cathode active material particles and the distilled water were mixed together so that the concentration of the cathode active material particles reached 60% by mass, thereby preparing a suspended slurry.

The suspended slurry was injected into a sand mill together with zirconia balls having a diameter of 0.1 mm, and a dispersion treatment was carried out with the treatment time of the sand mill adjusted so that the ratio (D90/D10) of the particle diameter (D90) at a cumulative percentage of 90% to the particle diameter (D10) at a cumulative percentage of 10% in the cumulative particle size distribution of the cathode active material particles in the suspended slurry reached two.

Next, an aqueous solution of citric acid which had been adjusted to 30% by mass, which amounted to 1.0% by mass of the cathode active material particles in terms of the solid content of the citric acid, was mixed into the slurry on which the dispersion treatment had been carried out, furthermore, distilled water was mixed therewith so that the concentration of the cathode active material particles in the slurry reached 50% by mass, and then the mixture was sprayed and dried in the atmosphere at 180° C., thereby obtaining a granulated dried substance of the cathode active material particles.

Next, polyvinyl alcohol powder, which amounted to 3.5% by mass of the cathode active material particles, was mixed into the obtained dried substance in a dry manner, and a thermal treatment was carried out at 750° C. in an inert atmosphere for one hour so as to support carbon in the cathode active material particles, thereby producing a cathode material for a lithium-ion secondary battery of Example 1.

Example 2

A cathode material for a lithium-ion secondary battery of Example 2 was produced in the same manner as in Example 1 except for the fact that an aqueous solution of citric acid which had been adjusted to 30% by mass in advance, which amounted to 1.0% by mass of the cathode active material particles in terms of the solid content of the citric acid, was mixed into the slurry on which the dispersion treatment had been carried out using a sand mill, and furthermore, distilled water was mixed therewith so that the concentration of the cathode active material particles in the slurry reached 25% by mass.

Example 3

A cathode material for a lithium-ion secondary battery of Example 3 was produced in the same manner as in Example 1 except for the fact that a suspended slurry adjusted so that the concentration of the cathode active material particles reached 60% by mass was injected into a sand mill together with zirconia balls having a diameter of 1 mm, and a dispersion treatment was carried out with the treatment time of a ball mill adjusted so that the ratio (D90/D10) reached 25 in the cathode active material particles in the suspended slurry.

Example 4

A cathode material for a lithium-ion secondary battery of Example 4 was produced in the same manner as in Example 3 except for the fact that an aqueous solution of citric acid which had been adjusted to 30% by mass in advance, which amounted to 1.0% by mass of the cathode active material particles in terms of the solid content of the citric acid, was mixed into the slurry on which the dispersion treatment had been carried out using a sand mill, and furthermore, distilled water was mixed therewith so that the concentration of the cathode active material particles in the slurry reached 25% by mass.

Example 5

An aqueous solution of citric acid which had been adjusted to 30% by mass in advance, which amounted to 1.0% by mass of the cathode active material particles in terms of the solid content of the citric acid, was mixed into the slurry on which the dispersion treatment had been carried out using a sand mill, furthermore, distilled water was mixed therewith so that the concentration of the cathode active material particles in the slurry reached 50% by mass, and then the mixture was sprayed and dried in the atmosphere at 180° C., thereby obtaining a granulated dried substance of the cathode active material particles.

Next, glucose powder, which amounted to 4.7% by mass of the cathode active material particles, was mixed into the obtained dried substance in a dry manner. Except for the above-described facts, an electrode material for a lithium-ion secondary battery of Example 5 was produced in the same manner as in Example 1.

Example 6

An electrode material for a lithium-ion secondary battery of Example 6 was produced in the same manner as in Example 5 except for the fact that an aqueous solution of citric acid which had been adjusted to 30% by mass in advance, which amounted to 1.0% by mass of the cathode active material particles in terms of the solid content of the citric acid, was mixed into the slurry on which the dispersion treatment had been carried out using a sand mill, and furthermore, distilled water was mixed therewith so that the concentration of the cathode active material particles in the slurry reached 25% by mass.

Comparative Example 1

A cathode material for a lithium-ion secondary battery of Comparative Example 1 was produced in the same manner as in Example 1 except for the fact that an aqueous solution of polyvinyl alcohol which had been adjusted to 15% by mass in advance, which amounted to 3.5% by mass of the cathode active material particles in terms of the solid content of the polyvinyl alcohol, was mixed into the slurry on which the dispersion treatment had been carried out using a sand mill, distilled water was mixed therewith so that the concentration of the cathode active material particles in the slurry reached 50% by mass, and then the mixture was sprayed and dried in the atmosphere at 180° C.

Comparative Example 2

A cathode material for a lithium-ion secondary battery of Comparative Example 2 was produced in the same manner as in Comparative Example 1 except for the fact that an aqueous solution of polyvinyl alcohol which had been adjusted to 15% by mass in advance, which amounted to 3.5% by mass of the cathode active material particles in terms of the solid content of the polyvinyl alcohol, was mixed into the slurry on which the dispersion treatment had been carried out using a sand mill, and distilled water was mixed therewith so that the concentration of the cathode active material particles in the slurry reached 25% by mass.

Comparative Example 3

Cake-form cathode active material particles obtained by means of hydrothermal synthesis were cleaned sufficiently a plurality of times with distilled water, and then the cathode active material particles and the distilled water were mixed together so that the concentration of the cathode active material particles reached 60% by mass, thereby preparing a suspended slurry. Next, a cathode material for a lithium-ion secondary battery of Comparative Example 3 was produced in the same manner as in Example 1 except for the fact that the dispersion treatment was not carried out on the suspended slurry and the aqueous solution of citric acid was not mixed therewith.

Comparative Example 4

Cake-form cathode active material particles obtained by means of hydrothermal synthesis were cleaned sufficiently a plurality of times with distilled water, and then the cathode active material particles and the distilled water were mixed together so that the concentration of the cathode active material particles reached 60% by mass, thereby preparing a suspended slurry. Next, a cathode material for a lithium-ion secondary battery of Comparative Example 4 was produced in the same manner as in Example 6 except for the fact that the dispersion treatment was not carried out on the suspended slurry and the aqueous solution of citric acid was not mixed therewith.

Evaluation of Cathode Materials

The obtained cathode materials were evaluated using the following methods. The results are shown in Table 1.

1. Particle Diameter (D90) at Cumulative Percentage of 90% in Cumulative Particle Size Distribution The particle diameters were measured using a laser diffraction particle size distribution analyzer (manufactured by Horiba Ltd., trade name: LA-950V2).

2. Specific Surface Area

The specific surface areas of the cathode materials were measured using a specific surface area meter (manufactured by MicrotracBEL Corp., trade name: BELSORP-mini,) and a BET method in which nitrogen ($N_2$) adsorption was used.

3. Oil Absorption Amount for which N-Methyl-2-Pyrrolidone (NMP) was Used (NMP Oil Absorption Amount)

The oil absorption amount for which N-methyl-2-pyrrolidone (NMP) was used was measured using a method according to JIS K5101-13-1 (refined linseed oil method) and linseed oil instead of NMP.

4. Powder Resistance Value

The cathode material was injected into a mold and was molded at a pressure of 50 MPa, thereby producing a specimen. The powder resistance value (Ω·cm) of the specimen was measured at 25° C. using a low resistivity meter (manufactured by Mitsubishi Chemical Corporation, trade name: Loresta-GP) and the four point measurement.

5. Electrode Density after Drying

The obtained cathode material, polyvinylidene fluoride (PVdF) as a binding agent, and acetylene black (AB) as a conductive auxiliary agent were mixed together so that the mass ratio therebetween reached 90:5:5, and furthermore, N-methyl-2-pyrrolidone (NMP) was added thereto as a solvent so as to impart fluidity, thereby producing a slurry.

Next, this slurry was applied and dried on a 30 μm-thick aluminum (Al) foil (current collector), and a cathode mixture layer was formed, thereby obtaining a cathode sheet.

The obtained cathode sheet was punched φ15.9 mm using a coin-type clicking machine, thereby producing a test specimen. The thickness of the test specimen was measured at five points, a value obtained by subtracting the thickness of the current collector from the average value thereof was considered as the thickness of the cathode, and the cathode volume was computed. Similarly, the mass of the cathode was computed from the difference in mass between the electrode and the current collector and was divided by the cathode volume, thereby obtaining an electrode density after drying.

Production of Cathodes

The obtained cathode material, polyvinylidene fluoride (PVdF) as a binding agent, and acetylene black (AB) as a conductive auxiliary agent were mixed together so that the mass ratio therebetween reached 90:5:5, and furthermore, N-methyl-2-pyrrolidone (NMP) was added thereto as a solvent so as to impart fluidity, thereby producing a slurry.

Next, this slurry was applied and dried on a 30 μm-thick aluminum (Al) foil (current collector). After that, the product was cut into a strip shape having an application width of 40 mm and was pressed at a total applied pressure of 5 t/250 mm using a roll presser, thereby producing a cathode of each of the examples and the comparative examples.

Evaluation of Cathodes

The obtained cathodes were evaluated using the following method. The results are shown in Table 1.

6. Film Thickness Change Percentage

The film thickness change percentage was computed from the thickness of the cathode excluding the thickness of the current collector after drying and the thickness of the current collector when being pressed at a total applied pressure of 5 t/250 mm using Expression (1) below.

Film thickness change percentage (%)=(the thickness of the cathode after drying−the thickness of the cathode when being pressed at a total applied pressure of 5 t/250 mm)/the thickness of the cathode after drying×100    (1)

Production of Lithium-Ion Secondary Batteries

The cathode pressed at a total applied pressure of 5 t/250 mm and a commercially available anode made of natural graphite were punched into a predetermined size, current-collecting tabs were welded to the cathode and the anode respectively, and the cathode and the anode were disposed in an aluminum laminate film through a separator made of a porous polypropylene film. An electrolyte including $LiPF_6$ having a concentration of 1 mol/$dm^3$ and having EC:DEC=50:50 (vol %) was injected into the aluminum laminate film and was sealed, thereby producing a lithium-ion secondary battery for battery characteristic evaluation.

Evaluation of Lithium-Ion Secondary Batteries

The obtained lithium-ion secondary batteries were evaluated using the following methods. The results are shown in Table 1.

7. Initial Discharge Capacity

A charge and discharge test of the lithium-ion secondary battery was repeatedly carried out three times at room temperature (25° C.) under a constant current at a cut-off voltage of 2.5 V to 3.7 V and a charge and discharge rate of 0.1C (10-hour charge and then 10-hour discharge), and the discharge capacity at the third cycle was considered as the initial discharge capacity.

8. Load Characteristics (Discharge Capacity Ratio)

After the initial discharge capacity was measured, as a charge and discharge test of the lithium-ion secondary battery, at room temperature (25° C.), the lithium-ion secondary battery was charged at a cut-off voltage of 2.5V to 3.7V and 0.2C (five-hour charge), was discharged at 3C (20-minute discharge), and the discharge capacity was measured.

The ratio between the 3C discharge capacity and the 0.1C discharge capacity (the initial discharge capacity) was considered as the load characteristics, and the load characteristics (the discharge capacity ratio) were computed using the following equation (2).

Discharge capacity ratio (%)=(3C discharge capacity/0.1C discharge capacity)×100      (2)

9. Direct Current Resistance (DCR)

The direct current resistance was measured using a lithium-ion secondary battery in which the depth of charge with a constant current at a charge rate of 0.1C at an ambient temperature of 0° C. was adjusted to 50% (SOC 50%). In the lithium-ion secondary battery adjusted to SOC 50% at room temperature (25° C.), currents were made to flow on the charge side and the discharge side alternatively at 1C, 3C, 5C, and 10C rates for ten seconds each, the current values and the voltage values after 10 seconds at the respective rates were plotted in the horizontal axis and the vertical axis respectively, and the slopes of the approximate value line obtained using the least square method on the charge side and on the discharge side were considered as "input DCR" and "output DCR" respectively. Meanwhile, at the respective currents, a 10-minute quiescent time was provided whenever the current flow direction or the flowing current was changed.

TABLE 1

| | D90 [μm] | Specific surface area [m²/g] | NMP oil absorption amount [mL/100 g] | Powder resistance value [Ω · cm] | Electrode density after drying [g/cm³] | Film thickness change percentage [%] | Initial discharge capacity [mAh/g] | Load characteristics (discharge capacity ratio) [%] | Direct current resistance Input DCR [Ω] | Direct current resistance Output DCR [Ω] |
|---|---|---|---|---|---|---|---|---|---|---|
| Example 1 | 12.7 | 12.2 | 40 | 97 | 1.13 | 12.9 | 138 | 96.8 | 3.1 | 2.7 |
| Example 2 | 9.9 | 12.3 | 35 | 81 | 1.19 | 8.0 | 140 | 97.1 | 2.6 | 2.6 |
| Example 3 | 14.8 | 10.2 | 44 | 116 | 1.05 | 23.1 | 135 | 93.9 | 3.2 | 2.8 |
| Example 4 | 8.7 | 10.9 | 33 | 108 | 1.20 | 16.7 | 137 | 96.6 | 3.1 | 2.8 |
| Example 5 | 8.2 | 13.2 | 39 | 369 | 1.15 | 10.1 | 138 | 97.4 | 2.8 | 2.7 |
| Example 6 | 8.2 | 15.0 | 29 | 215 | 1.23 | 6.9 | 140 | 96.8 | 2.6 | 2.5 |
| Comparative Example 1 | 23.4 | 11.6 | 72 | 777 | 0.78 | 50.0 | 126 | 80.3 | 6.2 | 3.4 |
| Comparative Example 2 | 19.2 | 11.6 | 65 | 639 | 0.82 | 43.3 | 126 | 80.7 | 4.7 | 3.4 |
| Comparative Example 3 | 19.1 | 7.8 | 64 | 594 | 0.85 | 51.6 | 123 | 75.7 | 7.6 | 4.2 |
| Comparative Example 4 | 17.7 | 8.9 | 57 | 1081 | 0.91 | 47.5 | 125 | 77.2 | 6.2 | 4.5 |

Summary of Results

When Examples 1 to 6 and Comparative Examples 1 to 4 were compared with each other using the results of Table 1, it could be confirmed that the cathodes for a lithium-ion secondary battery of Examples 1 to 6 had a low powder resistance value and a low film thickness change percentage. In addition, it could be confirmed that the lithium-ion secondary batteries of Examples 1 to 6 had a low direct current resistance value, an excellent initial discharge capacity, and excellent load characteristics.

What is claimed is:

1. A cathode material for a lithium-ion secondary battery made of agglomerated particles formed by agglomeration of a plurality of primary particles of a cathode active material represented by General Formula (1) below which are coated with a carbonaceous film,
   wherein a particle diameter (D90) at a cumulative percentage of 90% in a cumulative particle size distribution of the cathode material is 3.0 μm or more and 15 μm or less, $$Li_xA_yD_zPO_4 \qquad (1)$$

wherein
   A represents at least one element selected from the group consisting of Co, Mn, Ni, Fe, Cu, and Cr,
   D represents at least one element selected from the group consisting of Mg, Ca, Sr, Ba, Ti, Zn, B, Al, Ga, In, Si, Ge, Sc, and Y,
   $0.9 < x < 1.1$,
   $0 < y \leq 1$,
   $0 \leq z < 1$, and
   $0.9 < y+z < 1.1$;
   wherein a film thickness change percentage of the cathode mixture layer before and after a pressing according to the following measuring method is 30% or less,
   wherein in the measuring method,
   (A) the cathode material, a conductive auxiliary agent, and a binding agent in a weight ratio of cathode material/conductive auxiliary agent/binding agent=90:5:5 are mixed to produce a slurry, then
   (B) the slurry is applied on a 30 μm-thick aluminum current collector and dried to obtain a cathode mixture layer having an application width of 40 mm, then
   (C) the film thickness change percentage is calculated from the thickness of the cathode excluding the thickness of the current collector after drying and the thickness of the current collector when being pressed at a total applied pressure of 5 t/250 mm using the following expression:

Film thickness change percentage (%)=100×(thickness of the cathode after drying−thickness of the cathode when being pressed at a total applied pressure of 5 t/250 mm)/the thickness of the cathode after drying.

2. The cathode material for a lithium-ion secondary battery according to claim 1,
   wherein an oil absorption amount for which N-methyl-2-pyrrolidone is used is 50 ml/100 g or less.

3. The cathode material for a lithium-ion secondary battery according to claim 1,
wherein a specific surface area of the cathode material is 10 m$^2$/g or more and 25 m$^2$/g or less, and a powder resistance value is 500 Ω·cm or less.

4. A method for manufacturing the cathode material for a lithium-ion secondary battery according to claim 1, the method comprising:
a manufacturing step of a cathode active material represented by General Formula (1) and a cathode active material precursor;
a slurry preparation step of preparing a slurry by mixing at least one cathode active material raw material selected from the group consisting of the cathode active material and the cathode active material precursor obtained in the above-described step and water;
a granulation step of obtaining a granulated body by adding an agglomeration-maintaining agent to the slurry obtained in the above-described step; and
a calcination step of mixing an organic compound which is a carbonaceous film precursor into the granulated body obtained in the above-described step in a dry manner and calcinating the obtained mixture in a non-oxidative atmosphere.

5. An electrode for a lithium-ion secondary battery, comprising:
an aluminum current collector; and
a cathode mixture layer formed on the aluminum current collector,
wherein the cathode mixture layer includes the cathode material for a lithium-ion secondary battery according to claim 1.

6. The electrode for a lithium-ion secondary battery according to claim 5,
wherein an electrode density of the cathode mixture layer after drying is 1.0 g/cm$^3$ or more.

7. A lithium-ion secondary battery, comprising:
a cathode;
an anode; and
an electrolyte,
wherein the cathode includes the electrode for a lithium-ion secondary battery according to claim 5.

* * * * *